Figure 1:
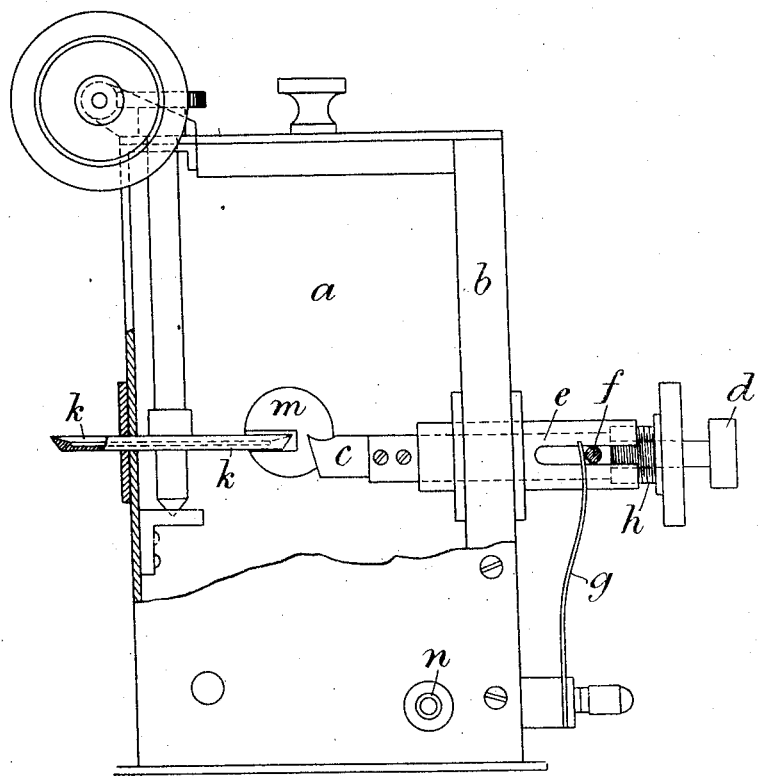

No. 890,451. PATENTED JUNE 9, 1908.
V. POULSEN.
GENERATOR OF ELECTRIC OSCILLATIONS.
APPLICATION FILED FEB. 1, 1908.

2 SHEETS—SHEET 1.

WITNESSES:
Waldo M Chapin
James D'Antonio

INVENTOR:
VALDEMAR POULSEN

BY Rosenbaum Stockbridge
ATTORNEYS

No. 890,451. PATENTED JUNE 9, 1908.
V. POULSEN.
GENERATOR OF ELECTRIC OSCILLATIONS.
APPLICATION FILED FEB. 1, 1908.
2 SHEETS—SHEET 2.
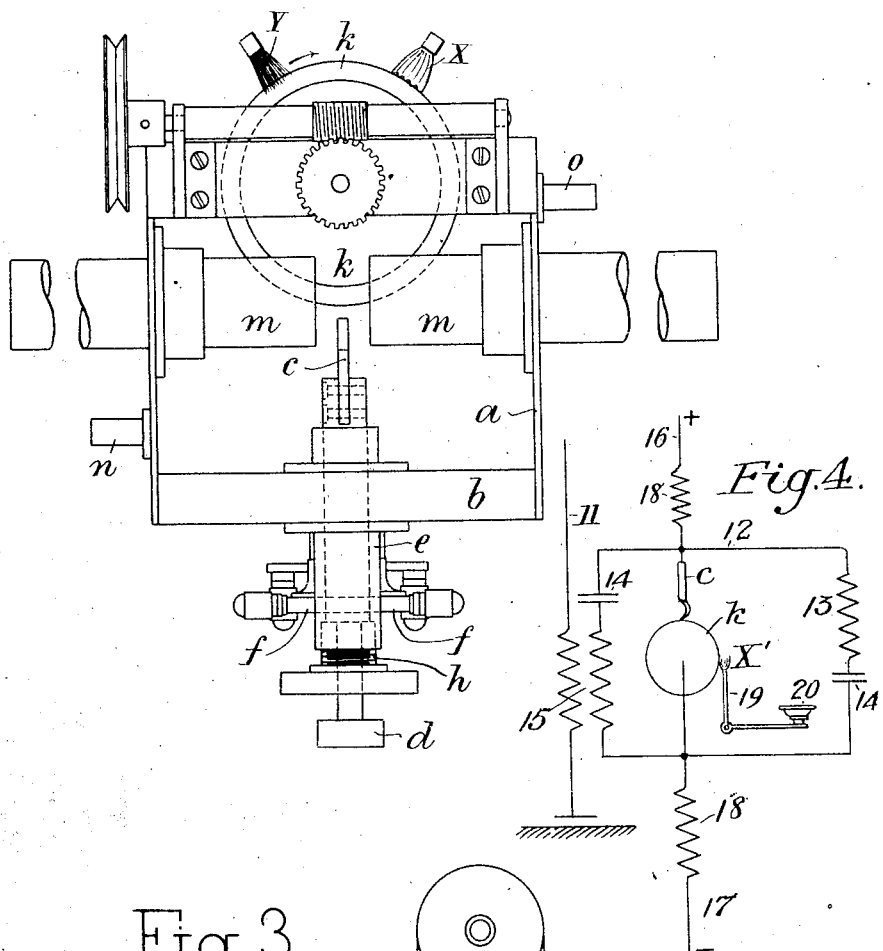
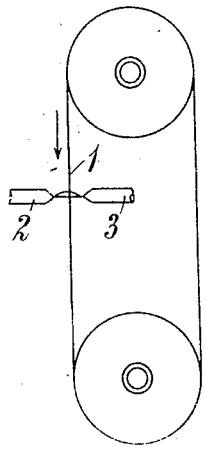
WITNESSES:
Waldo M Chapin
James D'Antonio
INVENTOR:
VALDEMAR POULSEN,
BY Rosenbaum Stockbridge
ATTORNEYS.

UNITED STATES PATENT OFFICE.

VALDEMAR POULSEN, OF COPENHAGEN, DENMARK.

GENERATOR OF ELECTRIC OSCILLATIONS.

No. 890,451.　　　Specification of Letters Patent.　　　Patented June 9, 1908.

Application filed February 1, 1908. Serial No. 413,839.

*To all whom it may concern:*

Be it known that I, VALDEMAR POULSEN, a subject of the King of Denmark, residing at Copenhagen, Denmark, have invented certain new and useful Improvements in Generators of Electric Oscillations, of which the following is a full, clear, and exact description.

In the generators of electric oscillations in which is used an electric arc connected with self-induction and capacity, it has, as a general rule, proved appropriate to use carbon as a material for at least one of the electrodes. Certain considerations, however, speak in favor of using metal electrodes, these for instance conserving their shape to a higher degree than the carbon electrodes, which is of great importance for the stability of the arc. Likewise, it is often advantageous to use electrodes of metal, as they are better heat conductors and therefore quickly lead off heat from the arc.

In the present invention, metal, for instance copper, is used as material for the cathode as well as for the anode, a thin layer of a material exercising a favorable influence on the stability of the oscillations produced by the generator being placed on the surface of one or both electrodes, thus forming the actual electrode material, and the invention aims at renewing this layer as it is consumed or destroyed through the action of the arc. Among the substances suitable for the application of the said thin layer, carbon may, in accordance with the above, be particularly recommended. It may be placed, for instance in the shape of a layer of soot, on the edge of a metal disk which rotates and forms one electrode, or a thin layer of Indian ink which dries and leaves a layer of carbon, may be applied with a brush or the like. Indirectly, a similar object may be attained by applying a film of oil or some other carbon-containing substance, which will then be destroyed by the arc and furnish a thin layer of carbon.

A practical form of such a generator is shown in the drawing, where

Figure 1 shows a side elevation of a generator in partial section, Fig. 2 a plan view of the same with the cover removed and Fig. 3 a modification. Fig. 4 is a diagrammatic view of the circuits.

In Figs. 1 and 2, $a$ indicates a house or a casing, in the marble-wall $b$ of which an electrode $c$ is movable in its longitudinal direction. The electrode $c$ is made of copper and arranged on a rod provided with a button $d$, which rod is movable in a tube $e$. A couple of pins $f$ in the rod pass through grooves in the tube $e$ and are actuated by a suitable spring $g$. A shoulder on the rod may rest against a movable sleeve $h$, which acts as stop and determines the distance of separation of the electrodes. The other electrode consists of a rotating copper disk $k$ which can be turned by a suitable transmission. The disk is arranged air-tight through one wall of the casing $a$. Moreover, the casing is provided with a couple of iron cores $m, m$, transversely recessed or grooved to fit over the disk electrode $k$, in case that it should be desired that the arc be acted upon by a magnetic field, and with inlet and outlet tubes $n$ and $o$, which are used in case it should be desired that the arc be formed in a particular gas.

The arc is produced by effecting contact between the electrodes $c$ and $k$ through a pressure on the button $d$, after which the electrode $c$ is removed, by the spring $g$, as far from the disk-shaped electrode $k$ as the stop $h$ allows.

On the surface of the electrode which is outside the casing, the actual electrode substance may now be applied; for instance, the disk may be placed in a sooting flame, liquid Indian ink, oil, or the like, may be laid on; or, by means of electrolysis, a metal coating of small thickness, for instance of nickel, may be applied on the disk.

A thin coating, for instance of antimony, may be obtained by means of a flame containing antimonid of hydrogen. I have illustrated a flame X which may be considered a sooting or antimony depositing flame.

Where, as in the example shown, a rotating disk endless band or the like is used as bearer of the actual electrode substance, the part of the electrode which has passed the arc, can be continuously cleaned before fresh electrode substance is applied. Y designates a brush or similar wiper which may be considered an example of a means or this purpose.

In Fig. 3, 1 indicates a band, which may be endless, and which is introduced between the electrodes 2 and 3, which band is movable and acts as an intermediate electrode. A coating of the kind mentioned may be applied on one or both sides of the said band.

If such a generator be used for wireless transmission of signals (telegraphy or telephony), the principle described affords the possibility of a new method of transmitting the signals. For instance, on the rotating electrode k, Figs. 1 and 2 mentioned, carbon may be applied according to the signaling, as Morse signs or the like, so as to obtain the variation desired in the intensity of the oscillations. It is obvious that fast speed telegraphy is rendered possible on this method, a band or wire prepared in advance in accordance with the Morse signs being quickly moved. Finally, if the substance be applied rhythmically in conformity with the speech, a wireless telephony is in this way rendered possible. This may be realized by the coating being varied quantitatively, qualitatively, or in both respects, in conformity with the speech, for instance by means of a microphone current, if the coating is applied in electrolytical way, or by actuating acoustically a flame or a jet containing the substance.

It is a well-known fact that, in generators of the kind mentioned, it is advantageous to arrange the arc in a hydrogen-containing atmosphere. This may be combined with the present principle, by applying to both electrodes a substance containing hydrogen, for instance, as mentioned above, oil or the like. The latter substance will then be decomposed, totally or partially, in the arc, so that not only the coating is obtained, but also that the arc is surrounded by a hydrogen containing atmosphere.

The bodies used as electrodes may if desired have water flowing through them being in this case made hollow, or they may be cooled in any other suitable way.

In Fig. 4 I have illustrated a practical arrangement of oscillation circuit in which an apparatus constructed as above described may be embodied. 11 designates an aerial and 12 is a closed oscillation circuit including inductance 13 and capacity 14. 15 is a transformer or air coil coupling the aerial with the oscillation circuit 12. 16 and 17 designate connections from a source of electric potential or power, and which is connected through the inductances 18 with the electrodes c and k of the arc. The antimony depositing flame or other similar flame or device X' may be mounted on a lever 19 which is displaced by a key 20 so that the flame moves into and out of contact with the electrode k. It is evident that, if the electrode k rotates slowly, the film deposited on its surface will vary in accordance with the movements of the key 20. The oscillations of the arc and the transmission of the signals will therefore take place in accordance with the movements of the transmitting key as required.

Having thus described my invention, I claim as new and desire to secure by Letters Patent.

1. In an apparatus for generating electrical oscillations by means of an electric arc or the like, a circuit including inductance and capacity, an electrode in said circuit, an electrode having a thin coating forming the actual electrode substance, and means for continuously renewing said coating.

2. In an apparatus for generating electrical oscillations by means of an electric arc or the like, an oscillation circuit, an electrode in such circuit, another electrode having a thin coating constituting the actual electrode substance, and means for renewing said coating continuously in accordance with the signals or vibrations to be transmitted.

In witness whereof, I subscribe my signature, in the presence of two witnesses.

VALDEMAR POULSEN.

Witnesses:
  VIGGO BLOM,
  AXEL PERMIN